(12) United States Patent
Yokoyama et al.

(10) Patent No.: US 12,400,012 B2
(45) Date of Patent: Aug. 26, 2025

(54) INFORMATION MANAGEMENT SYSTEM, METHOD OF CONTROLLING THE INFORMATION MANAGEMENT SYSTEM, AND STORAGE MEDIUM STORING PROGRAM

(71) Applicant: CANON KABUSHIKI KAISHA, Tokyo (JP)

(72) Inventors: Shuma Yokoyama, Kanagawa (JP); Ayaka Kinoshita, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 250 days.

(21) Appl. No.: 17/838,048

(22) Filed: Jun. 10, 2022

(65) Prior Publication Data

US 2022/0405413 A1 Dec. 22, 2022

(51) Int. Cl.
*G06F 21/62* (2013.01)
*G06F 21/60* (2013.01)
*G06T 11/00* (2006.01)

(52) U.S. Cl.
CPC ........ *G06F 21/6218* (2013.01); *G06F 21/602* (2013.01); *G06T 11/00* (2013.01)

(58) Field of Classification Search
CPC .... G06F 21/6218; G06F 21/602; G06F 21/64; G06T 11/00; G06T 11/60
See application file for complete search history.

(56) References Cited

U.S. PATENT DOCUMENTS

| | | | |
|---|---|---|---|
| 11,363,185 B1* | 6/2022 | Svendsen | G06V 20/30 |
| 11,412,096 B2* | 8/2022 | Sohma | H04N 1/00856 |
| 2008/0118112 A1* | 5/2008 | Gotoh | G06V 30/18143 |
| | | | 358/1.9 |
| 2023/0139932 A1* | 5/2023 | Xia | G06F 3/1423 |
| | | | 715/734 |

FOREIGN PATENT DOCUMENTS

| | | |
|---|---|---|
| JP | 2006209744 A | 8/2006 |
| JP | 5988554 B2 * | 9/2016 |
| JP | 2019121946 A | 7/2019 |

\* cited by examiner

*Primary Examiner* — Jeffrey C Pwu
*Assistant Examiner* — Mayasa A. Shaawat
(74) *Attorney, Agent, or Firm* — Canon U.S.A., Inc., IP Division

(57) ABSTRACT

An information management apparatus is provided and includes a processor and a memory storing instructions which, when executed by the processor, configure the processor of the information management apparatus to register second information about a second image modified from a first image in a blockchain for management, and determine whether modification content of the second image meets a permission condition based on permission information indicating a permission condition that describes a type of modification able to be performed on the first image, the permission information being included in first information about the first image. The first image is managed through registration of the first information in the blockchain, and the second information is registered in the blockchain if the information management apparatus determines that the modification content of the second image meets the permission condition.

12 Claims, 6 Drawing Sheets

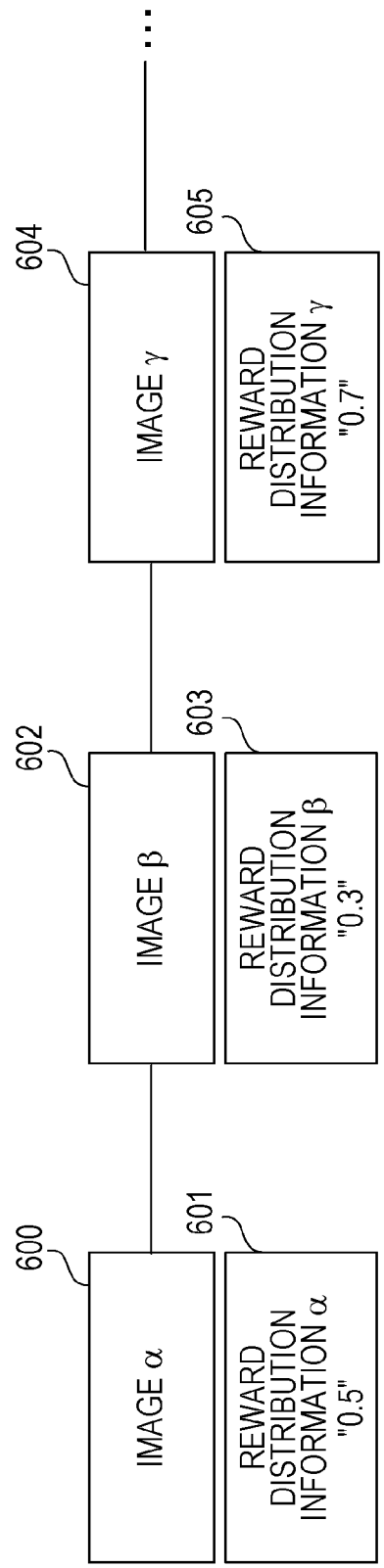

INFORMATION MANAGEMENT SYSTEM, METHOD OF CONTROLLING THE INFORMATION MANAGEMENT SYSTEM, AND STORAGE MEDIUM STORING PROGRAM

BACKGROUND

Field

The present disclosure relates to an information management system, a method of controlling the information management system, and a storage medium storing a program.

Description of the Related Art

Fake images that are so sophisticated that it is difficult to determine whether they are actually captured have been generated in recent years owing to development of techniques of editing images. Accordingly, it is required to ensure authenticity of the captured images. Japanese Patent Laid-Open No. 2006-209744 discloses a method of generating a hash value from an image using a hash function in capturing of the image, adding a digital signature to the hash value, and registering the hash value with the digital signature in a blockchain. Japanese Patent Laid-Open No. 2019-121946 discloses a technique of managing a history of modification of content using the blockchain.

Although the ensuring of the authenticity of images and management of a modification history of images modified from an original image are available with the method and the technique described above, no limitation is imposed on the modification of the images. Consequently, it is not possible to appropriately manage the validity of modification of the images.

Accordingly, it is desirable to appropriately manage the authenticity of a modified image while ensuring the validity of modification from an original image.

SUMMARY OF THE INVENTION

According to an embodiment of the disclosure, an information management apparatus is provided and includes a processor and a memory storing instructions which, when executed by the processor, configure the processor of the information management apparatus to register second information about a second image modified from a first image in a blockchain for management, and determine whether modification content of the second image meets a permission condition based on permission information indicating a permission condition that describes a type of modification able to be performed on the first image, the permission information being included in first information about the first image. The first image is managed through registration of the first information in the blockchain, and the second information is registered in the blockchain if the information management apparatus determines that the modification content of the second image meets the permission condition.

Further features of the present invention will become apparent from the following description of exemplary embodiments with reference to the attached drawings.

BRIEF DESCRIPTION OF THE DRAWINGS

FIG. 6 is a diagram for describing reward distribution.

DESCRIPTION OF THE EMBODIMENTS

Figure 1A:
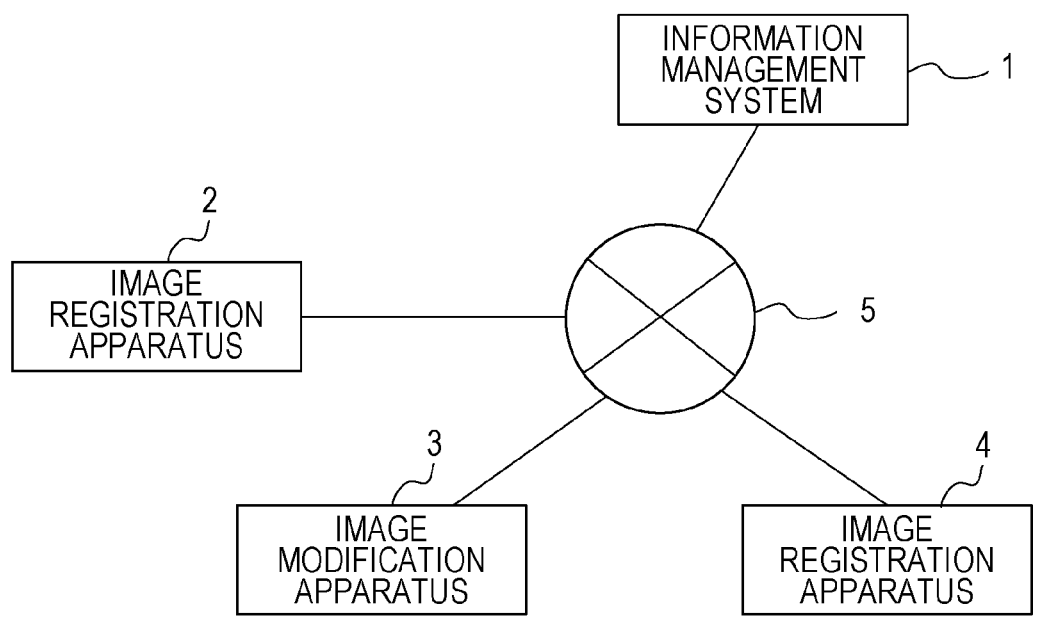
FIG. 1A illustrates an exemplary system configuration including an information management system according to a first embodiment.

Embodiments of the present disclosure will herein be described with reference to the drawings. The embodiments described below do not limit the present disclosure according to the appended claims and all the combinations of features described in the embodiments are not necessarily essential to resolution of the present disclosure. The same reference numerals are added to the same components for description.

First Embodiment

FIG. 1A illustrates an exemplary system configuration including an information management system according to a first embodiment.

An information management system 1 manages images acquired from image registration apparatuses 2 and 4, information about the images, and a modification history of the images. As illustrated in FIG. 1A, the information management system 1, the image registration apparatus 2, an image modification apparatus 3, and the image registration apparatus 4 are connected to each other over a network 5 to enable transmission and reception of data. The image registration apparatus 2 is an apparatus for registering a source original image in the information management system 1 and is, for example, a camera, a smartphone, or a personal computer (PC). The image modification apparatus 3 is an apparatus for modifying an original image acquired from the information management system 1 and is, for example, a camera, a smartphone, or a PC having an image editing application installed therein. An image modified by the image modification apparatus 3 (hereinafter referred to as a modified image) is supplied to the image registration apparatus 4. The image registration apparatus 4 is an apparatus for registering the modified image supplied from the image modification apparatus 3 in the information management system 1 and is realized by the same configuration as that of the image registration apparatus 2. The image modification apparatus 3 may be integrated with the image registration apparatus 4.

Figure 1B:
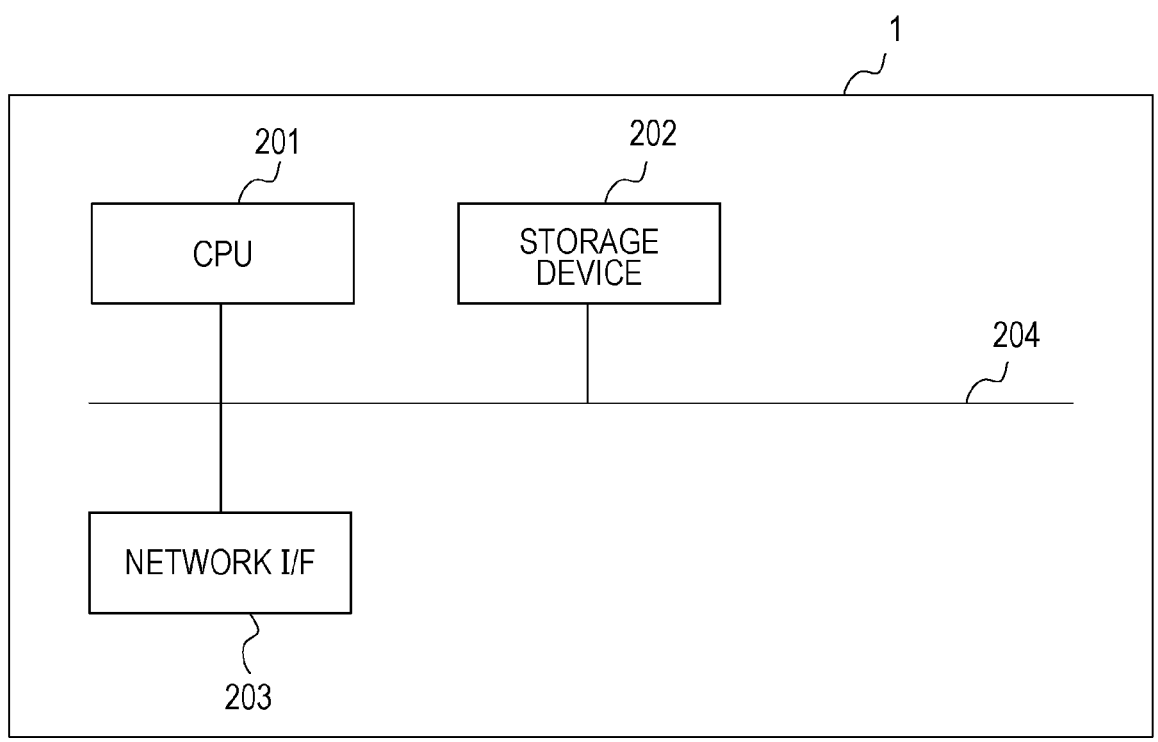
FIG. 1B is a block diagram illustrating an example of the hardware configuration of the information management system according to the first embodiment.

FIG. 1B is a block diagram illustrating an example of the hardware configuration of the information management system 1 according to the first embodiment. The information management system 1 is composed of a central processing unit (CPU) 201, a storage device 202, and a network interface (I/F) 203. The CPU 201, the storage device 202, and the network I/F 203 are connected to each other via a bus 204.

The CPU 201 controls the entire operation of the information management system 1. The CPU 201 performs processes based on programs stored in the storage device 202. The storage device 202 is realized by, for example, a hard disk drive (HDD) or a flash memory and stores various programs, image data, databases, and so on. The network I/F 203 is an interface for network communication with an external apparatus. The information management system 1 performs various processes in response to processing requests, which are received from the image registration apparatuses 2 and 4 and the image modification apparatus 3 via the network I/F 203, and performs the transmission and reception of data.

Although a case is exemplified in the first embodiment in which one CPU 201 executes the programs stored in the storage device 202 and so on to perform processes illustrated in a flowchart and a sequence diagram described below, another aspect may be adopted. For example, the respective processes described below may be performed through cooperation of multiple CPUs, HDDs, and so on. The information management system 1 may not be realized by one apparatus and may be realized by multiple apparatuses corresponding to functions.

Figure 2:
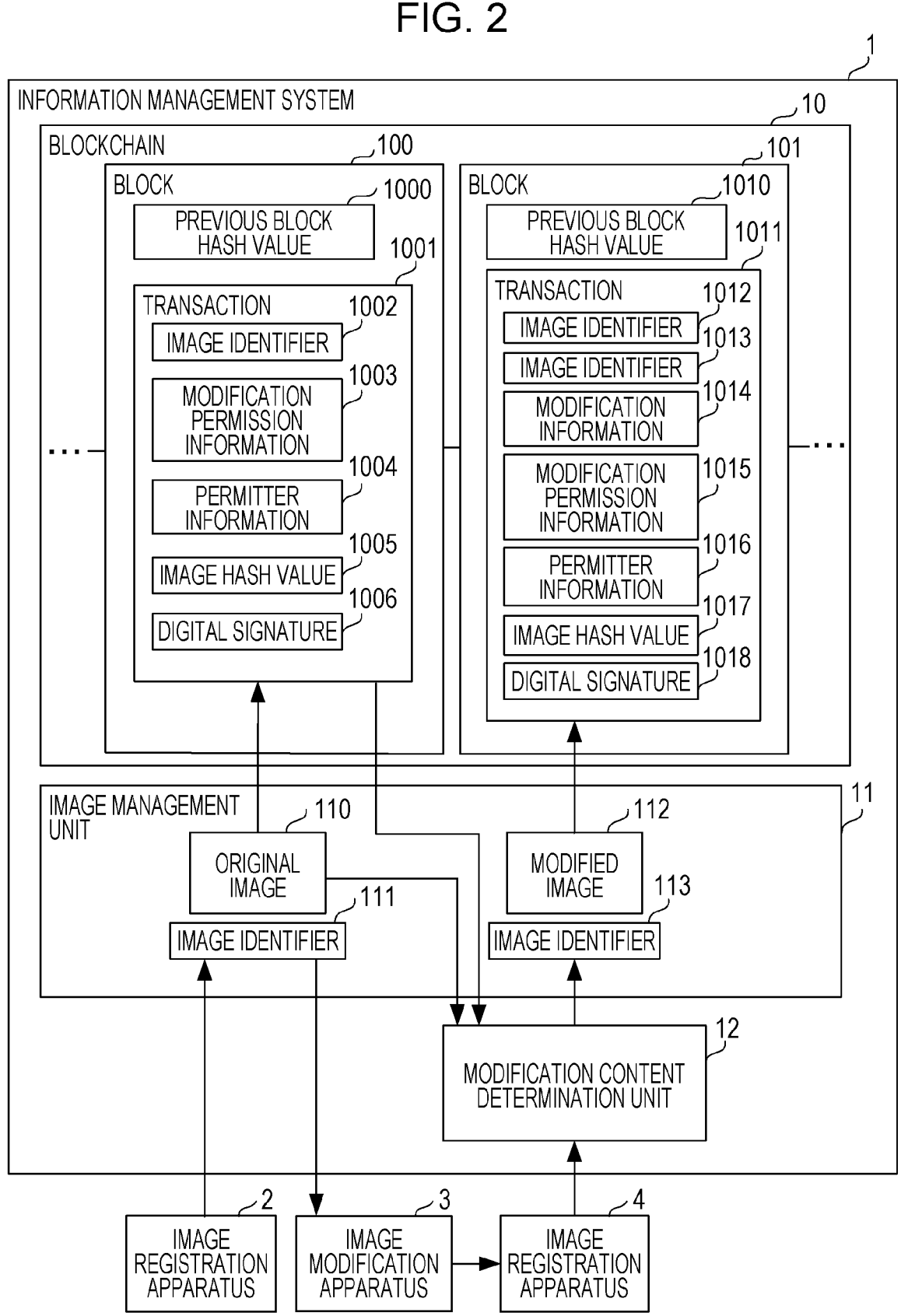
FIG. 2 is a block diagram illustrating an example of the functional configuration of the information management system according to the first embodiment.

FIG. 2 is a block diagram illustrating an example of the functional configuration of the information management system 1 according to the first embodiment. The information management system 1 has functions of an image management unit 11 and a modification content determination unit 12 and manages information about images to be registered in the image management unit 11 using a blockchain 10.

The blockchain 10 is a distributed ledger using an encryption technique on a network. The blockchain 10 according to the first embodiment may be composed of a peer-to-peer network or may be composed of a specific server apparatus. In the first embodiment, the blockchain 10 manages information about modification of images and a modification history of the images. The blockchain 10 will described in detail below.

The image management unit 11 is a functional unit that manages images. The image management unit 11 may be composed of a peer-to-peer network or may be composed of a specific server apparatus. In the first embodiment, the image management unit 11 manages an original image 110, an image identifier 111, which is an identifier corresponding to the original image 110, a modified image 112, and an image identifier 113, which is an identifier corresponding to the modified image 112, as illustrated in FIG. 2. Although the example is described in the first embodiment in which the image management unit 11 holds one original image, one image identifier corresponding to the one original image, one modified image, and one identifier corresponding to the one modified image, the image management unit 11 may hold many images and the image identifiers corresponding to the images.

The modification content determination unit 12 is a functional unit that determines whether the modification content of the modified image transmitted from the image registration apparatus 4 is permitted. The modification content determination unit 12 may be composed of a specific server apparatus or may be integrated with the blockchain 10 or the image management unit 11. In the first embodiment, the modification content determination unit 12 determines whether the modification content of the modified image is permitted based on information about a source image of the modified image, which is stored in the blockchain 10. If the modification content determination unit 12 determines that the modification content of the modified image is permitted, information about the modified image is registered in the blockchain 10. If the modification content determination unit 12 determines that the modification content of the modified image is not permitted, the modified image is not registered in the blockchain 10. A specific determination method will be described with reference to a flowchart in FIG. 3 described below. A determination program used to determine whether the modification is permitted may be managed in the blockchain 10. In this case, the modification content determination unit 12 functions as a smart contract, which is performed using a registration request of the modified image as a trigger, on the general blockchain.

The blockchain 10 will now be described in detail.

The blockchain 10 connects a block 100 with a block 101 for management. An example is illustrated in FIG. 2 in which information about the original image 110 is registered in the block 100 and information about the modified image 112 is registered in the block 101. The number of the blocks managed in the blockchain 10 is not limited to two. For example, the blockchain 10 may further connect a block with the block 101 and may register information about an image modified from the modified image 112 in the block connected with the block 101. In addition, the blockchain 10 is not limited to the configuration in which information about one image is registered in one block and may be configured to register information about multiple images in one block. The block 100 and the block 101 each include transaction information about the corresponding block for a predetermined period in the general blockchain.

First, the block 100 will be described. The block 100 is composed of a previous block hash value 1000 and a transaction 1001. Although the example is described in the first embodiment for simplification in which one transaction is included in one block, multiple transactions may be included in one block and the number of the transactions is not limited. The previous block hash value 1000 is a hash value resulting from conversion of information identifying a block (not illustrated) to be connected before the block 100 using a hash function and is information indicating the connection relationship with the previous block.

The transaction 1001 includes an image identifier 1002, modification permission information 1003, permitter information 1004, an image hash value 1005, and a digital signature 1006. The image identifier 1002 is the same as the image identifier 111 managed in the image management unit 11 and is information for associating the transaction 1001 with the original image 110 managed in the image management unit 11.

The modification permission information 1003 indicates a permission condition of modification of the original image 110. The modification permission information 1003 is set by an owner (a photographer, a manager, a copyright owner, a blockchain registerer, or the like) of the original image 110. The modification permission information 1003 may be information indicating a range to be permitted or information indicating a range not to be permitted. Specifically, information indicating, for example, permission or no permission of change of a specific color, permission or no permission of editing of a specific pixel range, permission or no permission of image enlargement and/or reduction, or permission or no permission of image rotation is set in the modification permission information 1003. The modification permission information 1003 may be a character string in a standard language such as English or may be an encoded character string. When the modification permission information 1003 is an encoded character string, the encoded character string is capable of being decoded by an apparatus, such as the image modification apparatus 3. When the encoded character string is capable of being decoded by the image modification apparatus 3, the information management system 1 may be configured to restrict a specific image modification operation by the image modification apparatus 3 based on the content of the modification permission information 1003. The restriction method is, for example, a method of graying out a button used for instruction of a specific operation on a graphical user interface (GUI) of the image editing application or a method of displaying a warning screen when a specific operation is performed.

The permitter information 1004 indicates the user type to which a user who is permitted to modify the original image 110 belongs. The permitter information 1004 is set by the owner (the photographer, the manager, the copyright owner, the blockchain registerer, or the like) of the original image 110. The permitter information 1004 may not be the information indicating the type of the user to be permitted and may be information indicating the type of the user not to be permitted. The user using the information management system 1 is required for user registration and an account name and/or a user identifier (ID) of the user is set in the permitter information 1004. A value generated from a digital signature or a public key in the general blockchain may be used as the permitter information 1004. A group name and/or a group ID indicating the group to which multiple users belong may be set in the permitter information 1004.

The image hash value 1005 is a hash value resulting from conversion of the original image 110 using a hash function. The image hash value 1005 is information for associating the original image 110 with the transaction 1001 to improve the authenticity of the original image 110.

The digital signature 1006 is a digital signature in the general blockchain and is a signature for confirming the registerer of the original image 110. For example, the digital signature 1006 is a value resulting from encryption of data to be registered in the information management system 1 using a private key.

Next, the block 101 will be described. The block 101 is composed of a previous block hash value 1010 and a transaction 1011.

The previous block hash value 1010 is the same as the previous block hash value 1000 and is a hash value resulting from conversion of information identifying the block 100 before the block 101 using a hash function in the first embodiment.

The transaction 1011 includes an image identifier 1012, an image identifier 1013, modification information 1014, modification permission information 1015, permitter information 1016, an image hash value 1017, and a digital signature 1018. The image identifier 1012 is the same as the image identifier 111 and the image identifier 1002. The image identifier 1012 is information for associating the transaction 1011 with the original image 110 managed in the image management unit 11 and indicates that the source of the modified image to be associated with the transaction 1011 is the original image 110.

The image identifier 1013 is the same as the image identifier 113 and is information for associating the transaction 1011 with the modified image 112 managed in the image management unit 11.

The modification information 1014 indicates how the original image 110 is modified to generate the modified image 112. Specifically, the modification information 1014 is image modification information, such as change of a specific color, editing of a specific pixel range, image enlargement and/or reduction, and image rotation. The modification information 1014 may be a character string in a standard language such as English or may be an encoded character string. The content of the image modification indicated in the modification information 1014 is the modification content within the range permitted in the modification permission information 1003. This is because the registration in the blockchain 10 is not permitted by the modification content determination unit 12 if the modification content is not within the permission range.

The modification permission information 1015 indicates a permission condition of modification of the modified image 112.

The modification permission information 1015 is set by an owner (a generator, a manager, a copyright owner, a blockchain registerer, or the like) of the modified image 112. Specific content of the information is the same as that of the modification permission information 1003.

The permitter information 1016 indicates the user type for which modification of the modified image 112 is permitted. The permitter information 1016 is set by the owner (the generator, the manager, the copyright owner, the blockchain registerer, or the like) of the modified image 112. Specific content of the information is the same as that of the permitter information 1004.

The image hash value 1017 is a hash value resulting from conversion of the modified image 112 using a hash function. The image hash value 1017 is information for associating the modified image 112 with the transaction 1011 to improve the authenticity of the modified image 112.

The digital signature 1018 is a digital signature in the general blockchain and is a signature for confirming the registerer of the modified image 112. Specific content of the digital signature 1018 is the same as that of the digital signature 1006.

Figure 3:
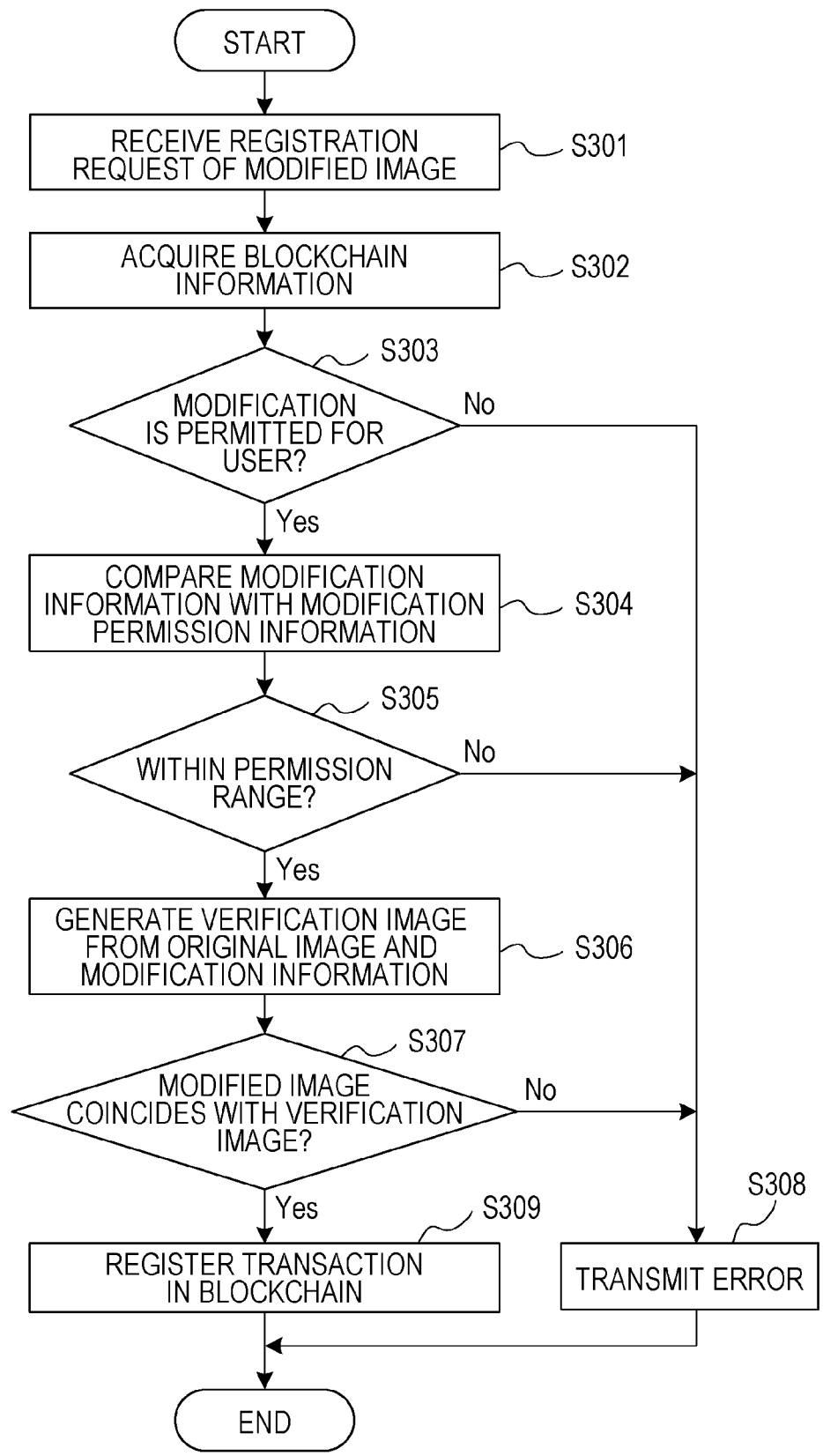
FIG. 3 is a flowchart illustrating a modification content determination process.

A modification content determination process performed by the modification content determination unit 12 will now be described in detail. FIG. 3 is a flowchart illustrating the modification content determination process. The flowchart illustrated in FIG. 3 is realized by the CPU 201 that executes the program stored in the storage device 202 or the like. S (Step) is added to the beginning of the step number of each step in the flowchart for description.

The modification content determination process is performed on the following assumption. The information management system 1 stores the original image 110 and the image identifier 111 of the original image 110, which are transmitted from the image registration apparatus 2, in a storage area of the storage device 202, which is managed by the image management unit 11, in response to a request from the image registration apparatus 2. In addition, the information management system 1 registers information about the original image 110 in the transaction 1001 and stores the information in a storage area of the storage device 202, which is managed by the blockchain 10. Then, the information management system 1 transmits the original image 110 and the image identifier 111 corresponding to the original image 110 to the image modification apparatus 3 in response to a request from the image modification apparatus 3. The image modification apparatus 3 transmits the modified image 112 modified from the original image 110 to the image registration apparatus 4. The flowchart in FIG. 3 is performed when the information management system 1 has received the registration request of the modified image 112 from the image registration apparatus 4.

Referring to FIG. 3, in S301, the CPU 201 receives the registration request of the modified image 112 from the image registration apparatus 4 via the network I/F 203. The received registration request includes the image identifier 111 of the original image 110, which is the source of the modified image 112, and the modification information 1014 indicating the content of the modification from the original image 110. In addition, the registration request includes the modification permission information 1015 for the modified image 112, the permitter information 1016 for the modified image 112, and the digital signature 1018 of the modified image 112.

In S302, the CPU 201 acquires the information about the image, which is the source of the modification, from the storage area of the storage device 202, which is managed by the blockchain 10. Specifically, the CPU 201 acquires the information in the transaction 1001 including the image identifier 1002, which is the same as the image identifier 111 included in the registration request.

In S303, the CPU 201 determines whether the user who has transmitted the registration request of the modified image belongs to the user type for which the modification is permitted based on the information acquired in S302. Specifically, the CPU 201 determines whether the user of the image registration apparatus 4 is within the range permitted in the permitter information 1004 with reference to the permitter information 1004 included in the transaction 1001. If the CPU 201 determines that the modification is permitted for the user (Yes in S303), the process goes to S304. If the CPU 201 determines whether the modification is not permitted for the user (No in S303), the process goes to S308.

In S304, the CPU 201 compares the modification content of the modified image with the permission information acquired in S302. Specifically, the CPU 201 compares the modification information 1014 about the modified image 112 with the modification permission information 1003 included in the transaction 1001.

In S305, the CPU 201 determines whether the modification content of the modified image meets the permission condition. Specifically, the CPU 201 determines whether the modification information 1014 is within the range permitted in the modification permission information 1003. For example, it is assumed that the permission of image reduction and permission of image rotation are set in the modification permission information 1003. If the content of the modification information 1014 includes content, such as color change, which is other than the image reduction and the image rotation, the CPU 201 determines that the modification content does not meet the permission condition (No in S305) and the process goes to S308. If the content of the modification information 1014 is both the image reduction and the image rotation or either of the image reduction and the image rotation, the CPU 201 determines that the modification content meets the permission condition (Yes in S305) and the process goes to S306.

In S306, the CPU 201 acquires the original image 110 corresponding to the image identifier 111 received in S301 from the storage area of the storage device 202, which is managed by the image management unit 11, and generates a verification image using the acquired original image 110 and the modification information 1014.

In S307, the CPU 201 determines whether the modified image 112 received in S301 coincides with the verification image generated in S306. If the CPU 201 determines that the modified image 112 coincides with the verification image (Yes in S307), the process goes to S309. If the CPU 201 determines that the modified image 112 does not coincide with the verification image (No in S307), the process goes to S308.

In S308, the CPU 201 transmits an error notification indicating that the registration of the modified image 112 is not enabled to the image registration apparatus 4. Then, the series of the steps in the flowchart illustrated in FIG. 3 are terminated.

In S309, the CPU 201 stores the modified image 112 received in S301 in the storage area of the storage device 202, which is managed by the image management unit 11. In addition, the CPU 201 registers the information about the modified image 112 in the transaction 1011 of the block 101 connected to the block 100 and stores the information in the storage area of the storage device 202, which is managed by the blockchain 10.

The information included in the registration request received in S301 is used as the information to be registered in the transaction 1011. Then, the series of the steps in the flowchart illustrated in FIG. 3 are terminated.

Through the modification content determination process described above, the registration in the blockchain 10 is enabled only if the image to be registered in the information management system 1 by the image registration apparatus 4 is within the range in which the modification is permitted. Accordingly, it is possible to limit the modification content and the user for whom the modification is permitted.

Figure 4:
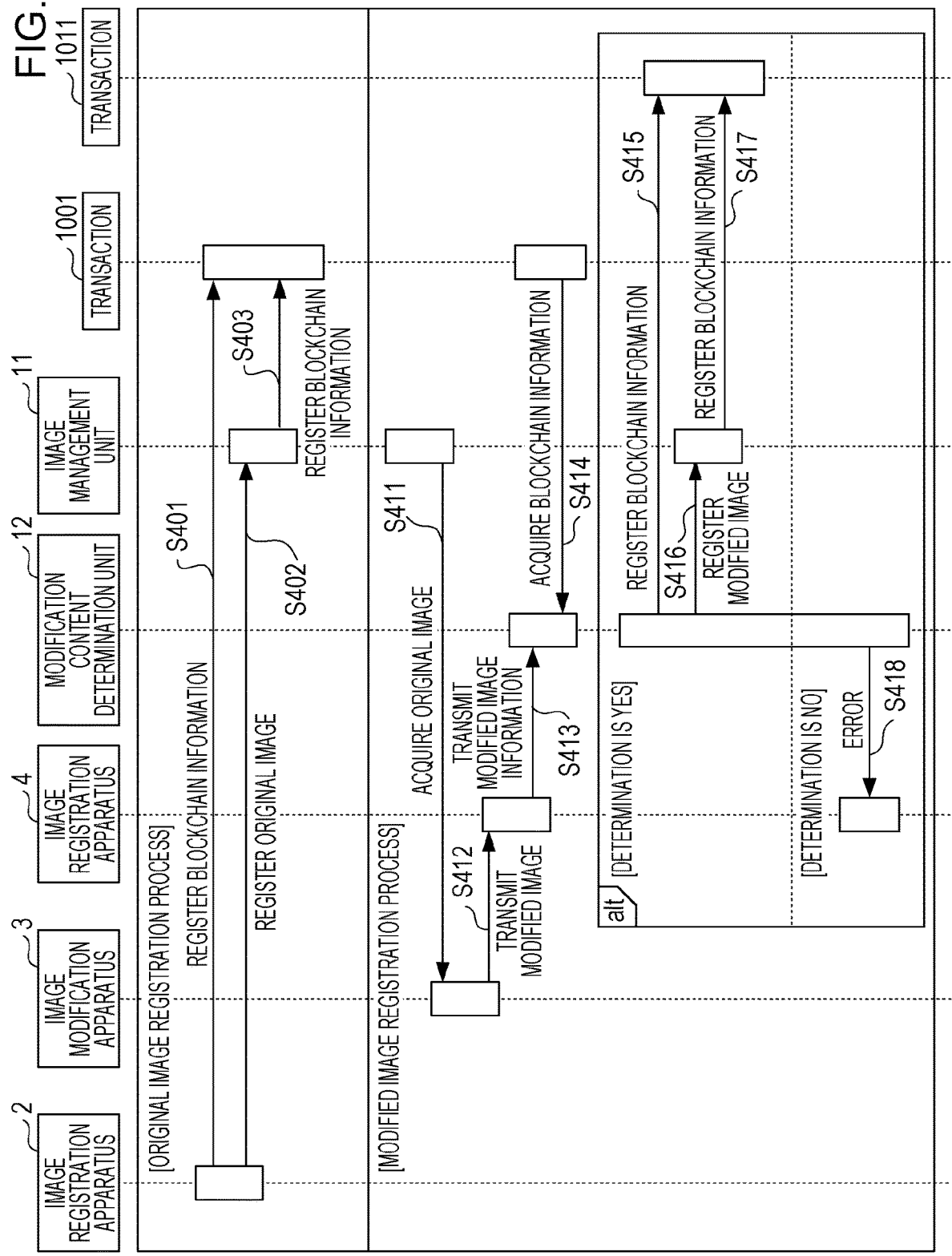
FIG. 4 is a sequence diagram indicating a series of operations by the information management system according to the first embodiment.

FIG. 4 is a sequence diagram indicating a series of operations by the information management system 1 according to the first embodiment. S is added to the beginning of the step number of each step in the following description and notation of Step is omitted herein.

The flow of an original image registration process is indicated in S401 to S403, which is performed when the original image is registered in the information management system 1. In S401, upon submission of the registration request of the original image 110 to the information management system 1 by the image registration apparatus 2, the blockchain 10 registers the modification permission information 1003, the permitter information 1004, and the digital signature 1006 for the original image 110 in the transaction 1001. Concurrently with S401, in S402, the image management unit 11 registers the original image 110.

In S403, the image management unit 11 generates the image hash value 1005 resulting from conversion of the original image 110 into a hash value and the image identifier 111 corresponding to the original image 110 and supplies the image hash value 1005 and the image identifier 111 to the blockchain 10. The blockchain 10 registers the image hash value 1005 that is supplied and the image identifier 1002, which is the same as the image identifier 111, in the transaction 1001.

This associates the original image 110 with the transaction 1001.

The image registration apparatus 2 may receive the image identifier 111 generated in the image management unit 11 and may directly register the image identifier 111 in the transaction 1001. How the image identifier 111 is generated and registered is not limited. In addition, the image registration apparatus 2 may generate the image hash value 1005 from the original image 110 and may directly the image hash value 1005 in the transaction 1001. How the image hash value 1005 is generated and registered is not limited.

The flow of a modified image registration process is indicated in S411 to S418, which is performed when the modified image is registered in the information management system 1. In S411, the image modification apparatus 3 acquires the original image 110 and the image identifier 111 corresponding to the original image 110 from the image management unit 11. In S412, the image modification apparatus 3 transmits the modified image 112 modified from the original image 110 to the image registration apparatus 4.

In S413, the image registration apparatus 4 submits the registration request of the modified image 112 to the information management system 1. The registration request includes the modified image 112, the image identifier 111, the modification information 1014, the modification permission information 1015, the permitter information 1016, and the digital signature 1018. In S414, the modification content determination unit 12 acquires the modification permission information 1003 and the permitter information 1004, which are included in the transaction 1001 associated with the image identifier 111. Then, the modification content determination unit 12 determines whether the modification information 1014 is permitted and whether the user of the image registration apparatus 4 is permitted based on the acquired information.

The flow of a process is indicated in S415 to S417, which is performed if the determination by the modification content determination unit 12 is affirmative (YES), that is, if the modification content of the modified image 112 is within the range permitted in the modification permission information 1003 and the permitter information 1004.

In S415, the blockchain 10 registers the image identifier 1012, the modification information 1014, the modification permission information 1015, the permitter information 1016, and the digital signature 1018 in the transaction 1011 in response to an instruction from the modification content determination unit 12. Concurrently with S415, in S416, the image management unit 11 registers the modified image 112 in response to an instruction from the modification content determination unit 12.

In S417, the image management unit 11 generates the image hash value 1017 resulting from conversion of the modified image 112 into a hash value and the image identifier 113 corresponding to the modified image 112 and supplies the image hash value 1017 and the image identifier 113 to the blockchain 10. The blockchain 10 registers the image hash value 1017 that is supplied and the image identifier 1013, which is the same as the image identifier 113, in the transaction 1011. This associates the modified image 112 with the transaction 1011.

The image registration apparatus 4 may receive the image identifier 113 generated in the image management unit 11 and may directly register the image identifier 113 in the transaction 1011. How the image identifier 113 is generated and registered is not limited. In addition, the image registration apparatus 4 may generate the image hash value 1017 from the modified image 112 and may directly the image hash value 1017 in the transaction 1011. How the image hash value 1017 is generated and registered is not limited. Then, the series of operations in the sequence diagram illustrated in FIG. 4 are terminated.

The flow of a process is indicated in S418, which is performed if the determination by the modification content determination unit 12 is negative (NO), that is, if the modification content of the modified image 112 is without the range permitted in the modification permission information 1003 and the permitter information 1004.

In S418, the modification content determination unit 12 transmits the error notification indicating that the registration is not enabled to the image registration apparatus 4. Then, the series of operations in the sequence diagram illustrated in FIG. 4 are terminated.

According to the first embodiment described above, the use of the blockchain, which connects the modification histories of the images for management, enables the limitation to be imposed on the modification content of the images and the user for which the modification of the images is permitted. Accordingly, it is possible to suppress modification that is not intended while ensuring the authenticity of the modification from the original image. In other words, it is possible to appropriately manage the modification of the images.

Second Embodiment

Figure 5:
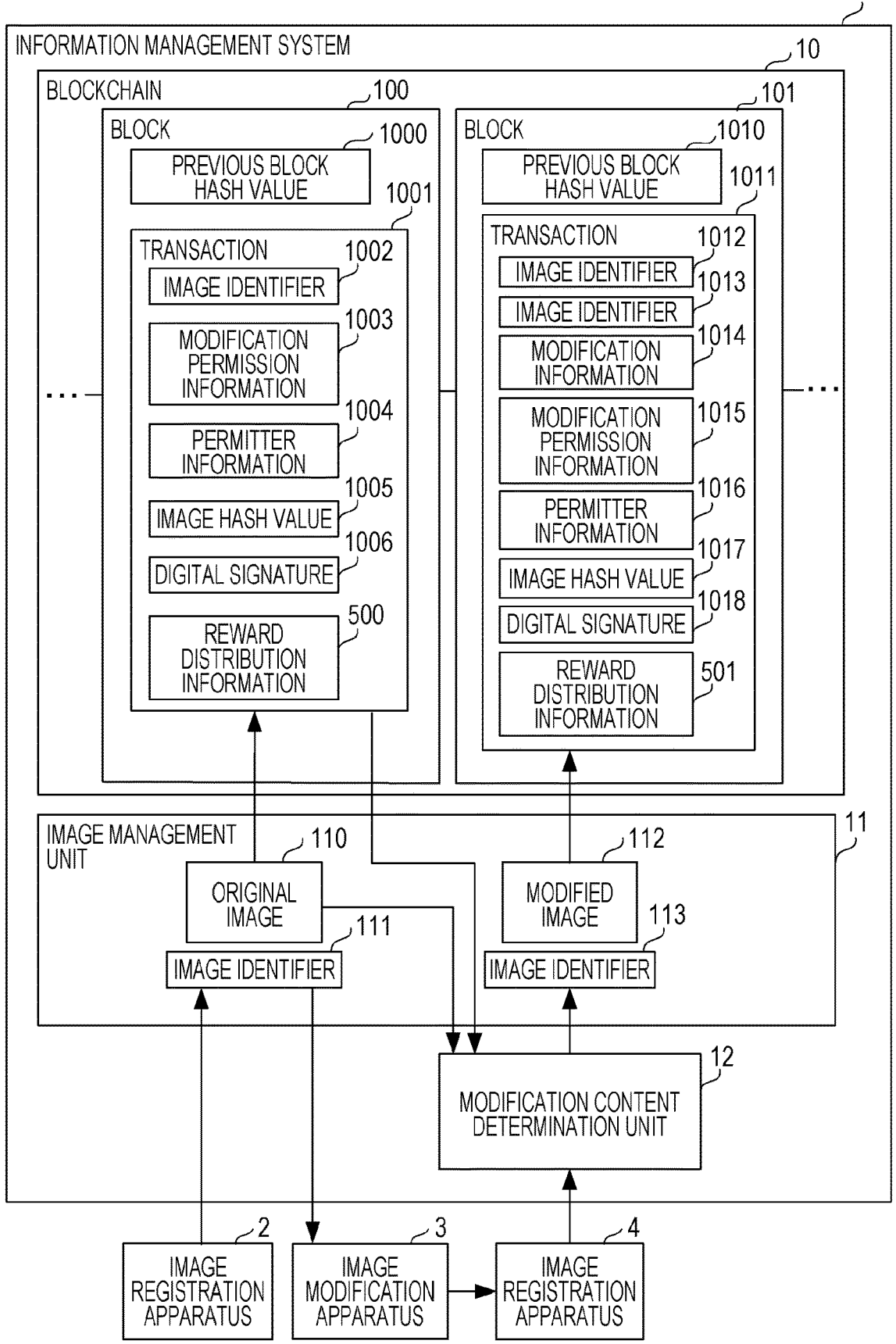
FIG. 5 is a block diagram illustrating an example of the functional configuration of the information management system according to a second embodiment.

FIG. 5 is a block diagram illustrating an example of the functional configuration of the information management system 1 according to a second embodiment. FIG. 5 differs from FIG. 2 in the first embodiment in that reward distribution information 500 is add to the transaction 1001 and reward distribution information 501 is added to the transaction 1011. A method of distributing a reward also to the registerer of the source original image using the reward distribution information 500 and the reward distribution information 501 if the reward occurs, for example, when the modification image is commercially used is described in the second embodiment. The same reference numerals are used for the same portions as in the first embodiment and a description of such portions is omitted herein.

The reward distribution information 500 is a setting value used for determining the reward to be distributed if a reward occurs in an image modified from the original image 110. The reward distribution information 500 is registered in the transaction 1001 by the owner (the photographer, the manager, the copyright owner, the blockchain registerer, or the like) of the original image 110. A specific setting value and a specific distribution method will be described below with reference to FIG. 6.

The reward distribution information 501 is a setting value used for determining the reward to be distributed if a reward occurs in an image modified from the modified image 112. The reward distribution information 501 is registered in the transaction 1011 by the owner (the generator, the manager, the copyright owner, the blockchain registerer, or the like) of the modified image 112. A specific setting value and a specific distribution method will be described below with reference to FIG. 6.

FIG. 6 is a block diagram illustrating the modification history of images and the reward distribution information associated with the images in the second embodiment. An example of a method of distributing the reward will now be described with reference to FIG. 6.

Referring to FIG. 6, an image α 600 is an image managed by the information management system 1 and is an original image that is not generated by modifying another image. Reward distribution information α 601 is the reward distribution information about the image α 600, which is set by the owner of the image α 600. It is assumed that the reward distribution information α 601 is a numerical value of 0.5.

An image β 602 is an image managed by the information management system 1 and is an image modified from the image α 600. Reward distribution information β 603 is the reward distribution information about the image β 602, which is set by the owner of the image β 602. It is assumed that the reward distribution information β 603 is a numerical value of 0.3.

An image γ 604 is an image managed by the information management system 1 and is an image modified from the image β 602. Reward distribution information γ 605 is the reward distribution information about the image γ 604, which is set by the owner of the image γ 604. It is assumed that the reward distribution information γ 605 is a numerical value of 0.7.

The method of distributing the reward using the images and the reward distribution information described above will now be described.

If a reward X (although the unit of the reward X is supposed to be a currency unit, the unit of the reward X is not limited) occurs in the image α 600, the owner of the image α 600 is capable of acquiring the reward X with no change. Since the reward distribution information α 601 is the setting when a reward occurs in an image modified from the image α 600, the reward distribution information α 601 is ignored.

If a reward Y occurs in the image β 602, the information management system 1 distributes a reward of Y×0.5 to the owner of the image α 600. The information management system 1 distributes a reward of Y−(Y×0.5) to the owner of the image β 602. Since the reward distribution information β 603 is the setting when a reward occurs in an image modified from the image β 602, the reward distribution information β 603 is ignored.

If a reward Z occurs in the image γ 604, the information management system 1 distributes a reward of Z×0.5 to the owner of the image α 600. The information management system 1 distributes a reward of (Z−(Z×0.5))×0.3 to the owner of the image β 602. The information management system 1 distributes a reward of Z−((Z−(Z×0.5))×0.3) to the owner of the image γ 604. Since the reward distribution information γ 605 is the setting when a reward occurs in an image modified from the image γ 604, the reward distribution information γ 605 is ignored.

According to the second embodiment described above, the use of the blockchain, which connects the modification histories of the images for management, enables a reward to be appropriately distributed also to the owner of the source original image if the reward occurs in the modified image. The setting values of the reward distribution information and the distribution method described above are only examples and the distribution of the reward may be performed using different setting values and a different distribution method. The setting values of the reward distribution information and the distribution method are not limited.

Although the embodiments of the present disclosure are described above, the embodiments are only examples for realizing the present disclosure and the technical scope of the present disclosure is not limitedly interrupted by the embodiments. In other words, the present disclosure is capable of being realized in various modes without departing from the technical idea and primary features of the present disclosure.

According to the present disclosure, it is possible to appropriately manage the authenticity of a modified image while ensuring the validity of modification from an original image.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-100089, filed Jun. 16, 2021, which is hereby incorporated by reference herein in its entirety.

What is claimed is:

1. An information management apparatus comprising:
a processor; and
a memory storing instructions which, when executed by the processor, cause the processor of the information management apparatus to:
register second information about a second image modified from a first image in a blockchain for management, and
determine whether modification content of the second image meets a permission condition based on permission information indicating the permission condition that describes a type of modification being able to be performed on the first image, the permission information being included in first information about the first image,
wherein the first image is managed through registration of the first information in the blockchain,
wherein the second information is registered in the blockchain if the information management apparatus determines that the modification content of the second image meets the permission condition,
wherein the second information is not registered in the blockchain if the information management apparatus determines that the modification content of the second image does not meet the permission condition,
wherein the instructions, when executed by the processor, further cause the processor of the information management apparatus to
generate a verification image using the first image and modification information indicating the modification content of the second image, and
wherein the determination is performed based on whether the second image coincides with the verification image.

2. The information management apparatus according to claim 1,
wherein the permission information includes a type of a user for which the modification of the first image is permitted, and wherein the determination is performed further based on whether a user who has submitted a registration request of the second image belongs to the type of the user.

3. The information management apparatus according to claim 1,
wherein the determination is performed if a registration request of the second image is submitted.

4. The information management apparatus according to claim 1,
wherein the permission information is information to permit or not to permit at least one of change of a specific color, editing of a specific pixel range, image enlargement, image reduction, and image rotation.

5. The information management apparatus according to claim 1,
wherein the second information includes information indicating a permission condition of modification of the second image.

6. The information management apparatus according to claim 1,
wherein the second information includes modification information indicating the modification content of the second image.

7. The information management apparatus according to claim 1,
wherein the instructions, when executed by the processor, further cause the processor of the information management apparatus to
manage the first image, a first identifier corresponding to the first image, the second image, and a second identifier corresponding to the second image,
wherein the first information includes the first identifier, and
wherein the second information includes the second identifier.

8. The information management apparatus according to claim 1,
wherein the instructions, when executed by the processor, further cause the processor of the information management apparatus to
receive the first image from an external apparatus, and
perform control so as to limit a modification operation for the first image based on the permission information.

9. The information management apparatus according to claim 1,
wherein the determination is performed using a function of a smart contract operating on the blockchain.

10. The information management apparatus according to claim 1,
wherein the first information and the second information are registered in a transaction of the blockchain.

11. A method of controlling information management, the method comprising:
registering second information about a second image modified from a first image in a blockchain for management;
determining whether modification content of the second image meets a permission condition based on permission information indicating the permission condition that describes a type of modification being able to be performed on the first image, the permission information being included in first information about the first image; and
generating a verification image using the first image and modification information indicating the modification content of the second image,
wherein the first image is managed through registration of the first information in the blockchain,
wherein the second information is registered in the blockchain if it is determined that the modification content of the second image meets the permission condition,
wherein the second information is not registered in the blockchain if it is determined that the modification content of the second image does not meet the permission condition, and
wherein the determination is performed based on whether the second image coincides with the verification image.

12. A non-transitory computer-readable storage medium storing a program that, when executed by a processor, causes the processor to perform operations comprising:
registering of second information about a second image modified from a first image in a blockchain for management,
determination of whether modification content of the second image meets a permission condition based on permission information indicating the permission condition that describes a type of modification being able to be performed on the first image, the permission information being included in first information about the first image, and
generating of a verification image using the first image and modification information indicating the modification content of the second image
wherein the first image is managed through registration of the first information in the blockchain,
wherein the second information is registered in the blockchain if it is determined that the modification content of the second image meets the permission condition,
wherein the second information is not registered in the blockchain if it is determined that the modification content of the second image does not meet the permission condition, and
wherein the determination is performed based on whether the second image coincides with the verification image.

* * * * *